United States Patent
Deprauw et al.

(10) Patent No.: US 12,484,483 B2
(45) Date of Patent: Dec. 2, 2025

(54) SIEVE INSTALLATION ARRANGEMENT IN A CLEANING SYSTEM OF AN AGRICULTURAL HARVESTER

(71) Applicant: CNH Industrial America LLC, New Holland, PA (US)

(72) Inventors: Jonas F.G. Deprauw, Lauwe (BE); Michiel J. Vanderstichele, Merkem (BE); Kris S. Vanhee, Deinze (BE)

(73) Assignee: CNH Industrial America LLC, New Holland, PA (US)

( * ) Notice: Subject to any disclaimer, the term of this patent is extended or adjusted under 35 U.S.C. 154(b) by 847 days.

(21) Appl. No.: 17/748,236

(22) Filed: May 19, 2022

(65) Prior Publication Data

US 2022/0369559 A1 Nov. 24, 2022

(30) Foreign Application Priority Data

May 21, 2021 (EP) .................................... 21175440

(51) Int. Cl.
*A01F 12/44* (2006.01)

(52) U.S. Cl.
CPC .......... *A01F 12/446* (2013.01); *A01F 12/448* (2013.01)

(58) Field of Classification Search
CPC ...... A01F 12/448; A01F 12/446; A01F 12/56; A01D 41/12; A01D 41/1252; A01D 41/127; A01D 41/1276
See application file for complete search history.

(56) References Cited

U.S. PATENT DOCUMENTS

| | | | | |
|---|---|---|---|---|
| 4,426,107 A | * | 1/1984 | Gibson | E05B 63/12 |
| | | | | 292/201 |
| 4,770,190 A | | 9/1988 | Barnett | |
| 5,405,094 A | * | 4/1995 | Poser | B02C 23/16 |
| | | | | 241/74 |

(Continued)

FOREIGN PATENT DOCUMENTS

| | | | |
|---|---|---|---|
| CN | 102225393 A | * | 10/2011 |
| DE | 1082077 B | | 5/1960 |
| GB | 1075906 | | 7/1967 |

OTHER PUBLICATIONS

Extended European Search Report for European Application No. 21175440.3, dated Nov. 10, 2021, 8 pages.

*Primary Examiner* — Joseph M Rocca
*Assistant Examiner* — Douglas J Meislahn
(74) *Attorney, Agent, or Firm* — Buchanan Ingersoll & Rooney PC (57) ABSTRACT

A sieve assembly for an agricultural harvester includes a cleaning shoe having a pair of opposed side rails, and a sieve which is removably installed within the cleaning shoe at a selected location against the side rails. The sieve has an upstream end defining a first angled surface, and a downstream end defining a second angled surface. The cleaning shoe includes a first engagement surface for engaging the first angled surface, and a pair of bolts, with each of the bolts being pivotally attached relative to a respective one of the side rails and engageable with a respective second angled surface. Each of the bolts has a longitudinal axis that is positioned at an acute angle (β) relative to the side rails of the cleaning shoe and biases the first angled surface into engagement with the first engagement surface when the bolts are tightened against a respective second angled surface.

14 Claims, 5 Drawing Sheets

(56) References Cited

U.S. PATENT DOCUMENTS

| | | | |
|---|---|---|---|
| 6,179,128 B1* | 1/2001 | Seyffert | B07B 1/48 |
| | | | 209/403 |
| 2003/0167744 A1* | 9/2003 | Quarles | A01D 75/306 |
| | | | 56/13.6 |
| 2009/0061968 A1 | 3/2009 | Claerhout et al. | |
| 2011/0187545 A1* | 8/2011 | Burrington | G01G 9/00 |
| | | | 702/41 |
| 2017/0291193 A1* | 10/2017 | Takev | B07B 1/46 |
| 2019/0284792 A1* | 9/2019 | López Blanco | E04B 1/1903 |
| 2020/0375110 A1* | 12/2020 | Wainer | A01D 45/065 |

* cited by examiner

SIEVE INSTALLATION ARRANGEMENT IN A CLEANING SYSTEM OF AN AGRICULTURAL HARVESTER

CROSS-REFERENCE TO RELATED APPLICATION

This application claims priority to European Patent Application No. 21175440.3, filed May 21, 2021, the content of such application being incorporated by reference herein in its entirety.

BACKGROUND OF THE INVENTION

1. Field of the Invention

The present disclosure relates to a cleaning system used in an agricultural harvester, such as a combine, and, more particularly, to a sieve used in such a cleaning system.

2. Description of the Related Art

An agricultural harvester combines multiple harvesting functions with a single harvesting unit, such as picking, threshing, separating and cleaning. A combine includes a header which removes the crop from a field, and a feeder housing which transports the crop matter into a threshing rotor. The threshing rotor rotates within a perforated housing, which may be in the form of adjustable concaves, and performs a threshing operation on the crop to remove the grain. Once the grain is threshed it falls through perforations in the concaves onto a grain pan. From the grain pan the grain is cleaned using a cleaning system, and is then transported to a grain tank onboard the combine. The cleaning system includes a cleaning fan which blows air through oscillating sieves to discharge chaff and other debris toward the rear of the combine. Non-grain crop material such as straw from the threshing section proceeds through a straw chopper and out the rear of the combine. When the grain tank becomes full, the combine is positioned adjacent a vehicle into which the grain is to be unloaded, such as a semi-trailer, gravity box, straight truck, or the like; and an unloading system on the combine is actuated to transfer the grain into the vehicle.

More particularly, a rotary threshing or separating system includes one or more rotors which can extend axially (front to rear) or transversely within the body of the combine, and which are partially or fully surrounded by a perforated concave. The crop material is threshed and separated by the rotation of the rotor within the concave. Coarser non-grain crop material such as stalks and leaves are transported to the rear of the combine and discharged back to the field. The separated grain, together with some finer non-grain crop material such as chaff, dust, straw, and other crop residue are discharged through the concaves and fall onto the grain pan where they are transported to the cleaning system. Alternatively, the grain and finer non-grain crop material may also fall directly onto the cleaning system itself.

The cleaning system further separates the grain from non-grain crop material, and typically includes a fan directing an air flow stream upwardly and rearwardly through vertically arranged sieves which oscillate in a fore and aft manner. The air flow stream lifts and carries the lighter non-grain crop material towards the rear end of the combine for discharge to the field. Clean grain, being heavier, and larger pieces of non-grain crop material, which are not carried away by the air flow stream, fall onto a surface of an upper sieve (also known as a chaffer sieve) where some or all of the clean grain passes through to a lower sieve (also known as a cleaning sieve). Grain and non-grain crop material remaining on the upper and lower sieves are physically separated by the reciprocating action of the sieves as the material moves rearwardly. Any grain and/or non-grain crop material remaining on the top surface of the upper sieve are discharged at the rear of the combine. Grain falling through the lower sieve lands on a bottom pan of the cleaning system, where it is conveyed forwardly toward a clean grain auger.

The clean grain auger is positioned below the lower sieve, and receives clean grain from each sieve and from the bottom pan of the cleaning system. The clean grain auger then augers the clean grain laterally sideways to a clean grain elevator, which in turn conveys the clean grain to a grain tank onboard the combine.

A sieve assembly typically includes one or more sieves which are installed within a cleaning shoe that is oscillated in fore and aft motions to clean the grain while air flows through the sieve assembly. A sieve used in the sieve assembly typically includes a plurality of louvres extending cross-wise between the sides of the sieve, with the louvres including a plurality of fingers which are attached at their rear edge to respective wires. Depending on the crop being harvested, size of the kernels, amount of non-crop matter, etc., the louvre spacing (between the fingers) may need to be adjusted during operation.

SUMMARY OF THE INVENTION

The present disclosure provides a sieve assembly with a sieve which is clamped against a cleaning shoe using a angled structure at the upstream end of the sieve and a pivoting bolt arrangement at the downstream end of the sieve.

The disclosure in one form is directed to a sieve assembly for use in an agricultural harvester. The sieve assembly includes a cleaning shoe having a pair of opposed side rails, and a sieve which is removably installed within the cleaning shoe at a selected location against the side rails. The sieve has a downstream end and an upstream end, with the upstream end defining at least one first angled surface, and the downstream end defining at least one second angled surface. The cleaning shoe includes at least one first engagement surface for engaging the at least one first angled surface at the upstream end of the sieve. The cleaning shoe also includes a pair of bolts, with each of the bolts being pivotally attached relative to a respective one of the side rails and engageable with a respective second angled surface. Each of the bolts has a longitudinal axis that is positioned at an acute angle ($\beta$) relative to the side rails of the cleaning shoe and biases the at least one first angled surface into engagement with the at least one first engagement surface when the bolts are tightened against the respective second angled surface.

In another embodiment, each of the second angled surfaces comprises an arcuate surface. A pair of spherical washers are associated with each respective bolt and engageable with a respective arcuate surface.

In another embodiment, each of the spherical washers has a radius of curvature which mates with a radius of curvature of the arcuate surface.

In another embodiment, the sieve includes opposed side members. The at least one first angled surface comprises a pair of first angled surfaces respectively positioned at the upstream ends of the two side members. The at least one second angled surface comprises a pair of second angled surfaces respectively positioned at the downstream ends of the two side members.

In yet another embodiment, the pair of second angled surfaces each include a slot allowing a respective one of the bolts to be pivoted into place within the slot.

In yet another embodiment, a pair of first corner pieces respectively define the first angled surfaces, and a pair of second corner pieces respectively define the second angled surfaces.

In yet another embodiment, each of the bolts comprises an eye bolt. A spherical washer, lock washer and nut are associated with each bolt.

In a further embodiment, each of the bolts has an axis of rotation (R) which is positioned below a respective side rail of the cleaning shoe.

In a further embodiment, the at least one first engagement surface comprises an angled surface defined by a bracket extending across the cleaning shoe between the side rails.

In a further embodiment, the downstream end and the upstream end are defined relative to a direction of air flow (F) through the sieve during operation.

In a still further embodiment, the acute angle (β) lies within a range of 30 degrees to 60 degrees.

In a still further embodiment, the at least one first angled surface is positioned at an acute angle (α) relative to the side rails of the cleaning shoe.

In a still further embodiment, a method of installing a sieve within a cleaning system of an agricultural harvester uses the sieve of the present disclosure.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

The terms "grain", "straw" and "tailings" are used principally throughout this specification for convenience but it is to be understood that these terms are not intended to be limiting. Thus "grain" refers to that part of the crop material which is threshed and separated from the discardable part of the crop material, which is referred to as non-grain crop material, MOG or straw. Incompletely threshed crop material is referred to as "tailings". Also the terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting.

Figure 1:
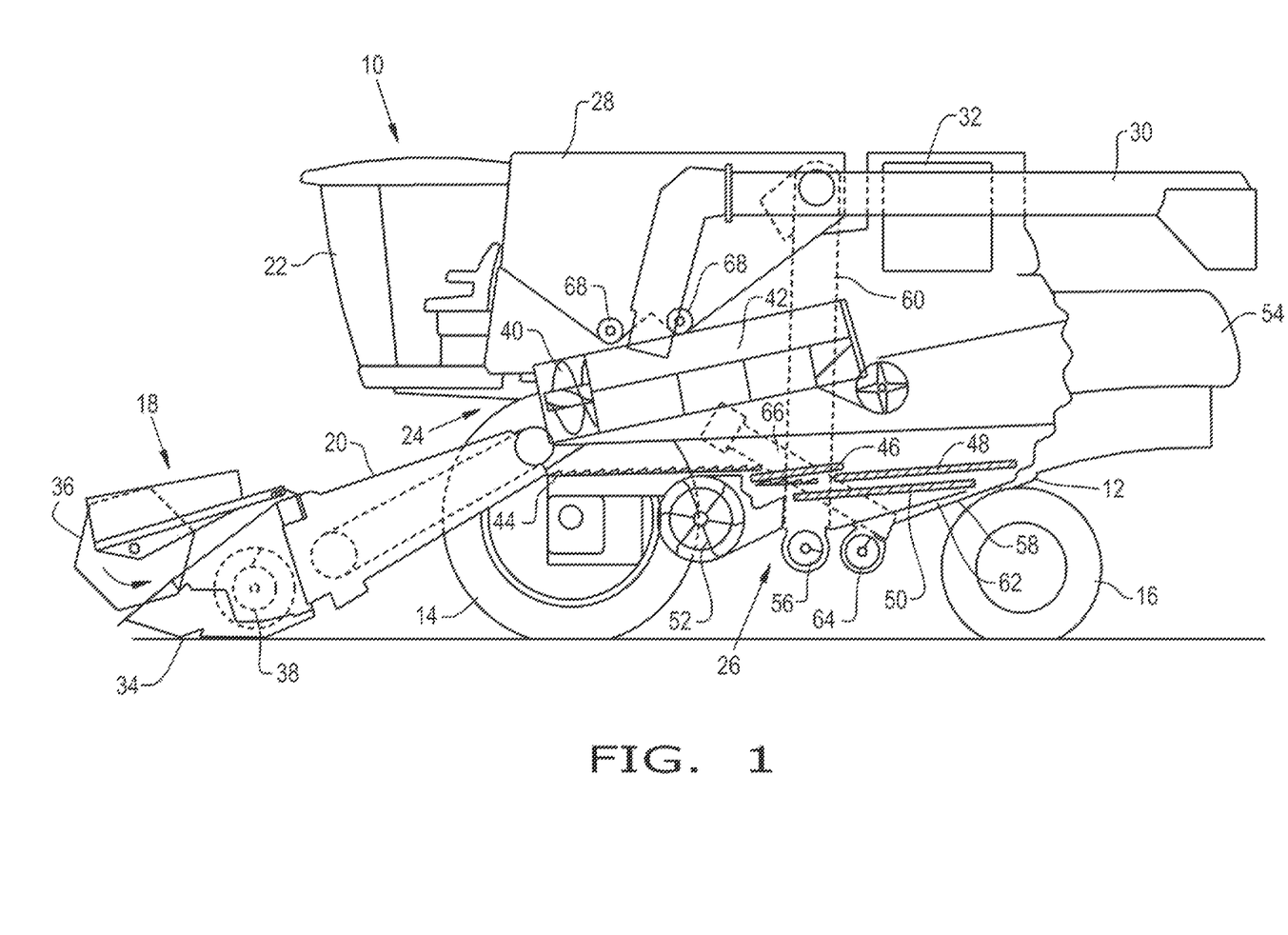
FIG. 1 is a side view of an embodiment of an agricultural harvester in the form of a combine which may include a cleaning system of the present disclosure.

Referring now to the drawings, and more particularly to FIG. 1, there is shown an agricultural harvester in the form of a combine 10, which generally includes a chassis 12, ground engaging wheels 14 and 16, header 18, feeder housing 20, operator cab 22, threshing and separating system 24, cleaning system 26, grain tank 28, and unloading auger 30.

Front wheels 14 are larger flotation type wheels, and rear wheels 16 are smaller steerable wheels. Motive force is selectively applied to front wheels 14 through a power plant in the form of a diesel engine 32 and a transmission (not shown). Although combine 10 is shown as including wheels, is also to be understood that combine 10 may include tracks, such as full tracks or half tracks.

Header 18 is mounted to the front of combine 10 and includes a cutter bar 34 for severing crops from a field during forward motion of combine 10. A rotatable reel 36 feeds the crop into header 18, and a double auger 38 feeds the severed crop laterally inwardly from each side toward feeder housing 20. Feeder housing 20 conveys the cut crop to threshing and separating system 24, and is selectively vertically movable using appropriate actuators, such as hydraulic cylinders (not shown).

Threshing and separating system 24 is of the axial-flow type, and generally includes a rotor 40 at least partially enclosed by and rotatable within a corresponding perforated concave 42. The cut crops are threshed and separated by the rotation of rotor 40 within concave 42, and larger elements, such as stalks, leaves and the like are discharged from the rear of combine 10. Smaller elements of crop material including grain and non-grain crop material, including particles lighter than grain, such as chaff, dust and straw, are discharged through perforations of concave 42. Threshing and separating system 24 can also be a different type of system, such as a system with a transverse rotor rather than an axial rotor, etc.

Grain which has been separated by the threshing and separating assembly 24 falls onto a grain pan 44 and is conveyed toward cleaning system 26. Cleaning system 26 may include an optional pre-cleaning sieve 46, an upper sieve 48 (also known as a chaffer sieve), a lower sieve 50 (also known as a cleaning sieve), and a cleaning fan 52. The upper sieve 48 and lower sieve 50 can be carried within a common framework, and are generally designated together as sieve 100, which will be described in more detail hereinafter. Grain on sieves 46, 48 and 50 is subjected to a cleaning action by fan 52 which provides an air flow through the sieves to remove chaff and other impurities such as dust from the grain by making this material airborne for discharge from straw hood 54 of combine 10. Grain pan 44 and pre-cleaning sieve 46 oscillate in a fore-to-aft manner to transport the grain and finer non-grain crop material to the upper surface of upper sieve 48. Upper sieve 48 and lower sieve 50 are vertically arranged relative to each other, and likewise oscillate in a fore-to-aft manner to spread the grain across sieves 48, 50, while permitting the passage of cleaned grain by gravity through the openings of sieves 48, 50.

Clean grain falls to a clean grain auger 56 positioned crosswise below and toward the front of lower sieve 50. Clean grain auger 56 receives clean grain from each sieve 48, 50 and from bottom pan 58 of cleaning system 26. Clean grain auger 56 conveys the clean grain laterally to a generally vertically arranged grain elevator 60 for transport to grain tank 28. Tailings from cleaning system 26 fall to a tailings auger trough 62. The tailings are transported via tailings auger 64 and return auger 66 to the upstream end of cleaning system 26 for repeated cleaning action. A pair of grain tank augers 68 at the bottom of grain tank 28 convey the clean grain laterally within grain tank 28 to unloading auger 30 for discharge from combine 10.

Figure 2:
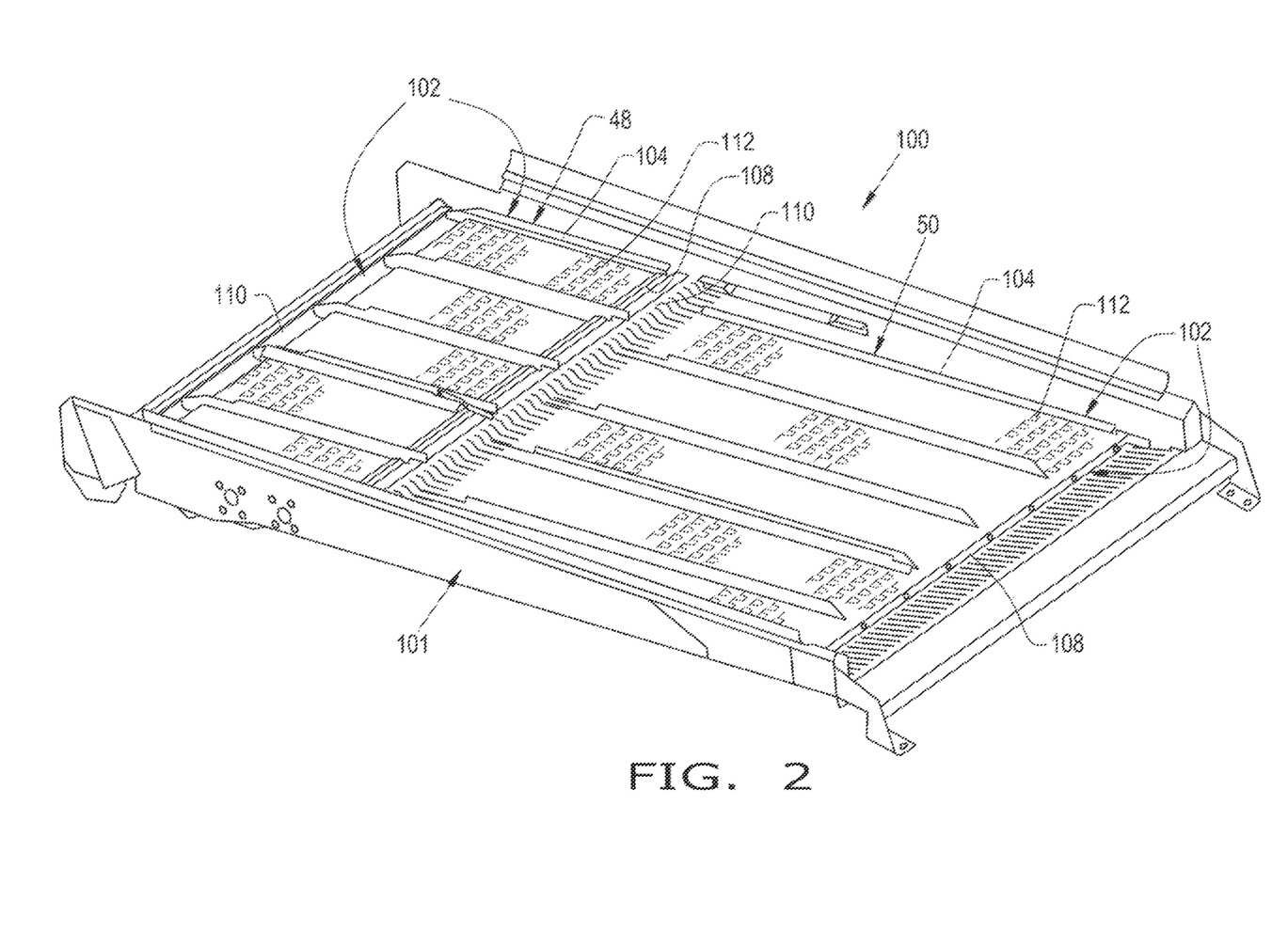
FIG. 2 is a perspective view of an embodiment of a sieve assembly of the present disclosure which can be used in the harvester of FIG. 1.
Figure 3:
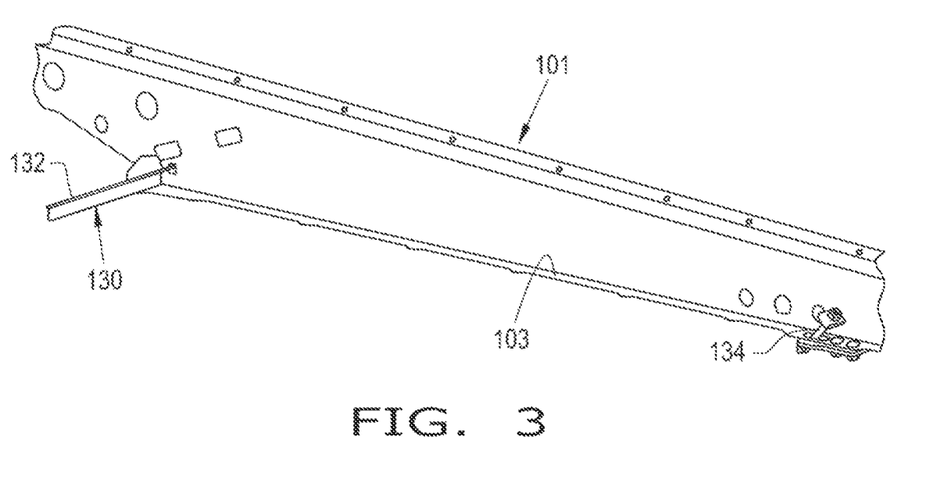
FIG. 3 is a partial perspective view of a cleaning shoe forming part of the sieve assembly shown in FIG. 2.

Referring now to FIGS. 2 and 3, the sieve assembly 100 includes a cleaning shoe 101 in which the upper sieve 48 and lower sieve 50 can be removably installed. The cleaning shoe 101 includes a pair of opposed and substantially identical side rails 103 (only one of which is visible in FIG. 3), upon which the lower sieve 50 can be mounted. The cleaning shoe 101 also includes another pair of side rails (not shown) located upstream from the side rail 103 visible in FIG. 3, upon which the upper sieve 48 can be installed.

According to an aspect of the present disclosure, the upper sieve 48 and lower sieve 50 are each clamped into the cleaning shoe 101 in such a way that the sieves 48, 50 are biased in both a rearward (upstream) direction and a downward direction against the side rails of the cleaning shoe 101. The upper sieve 48 and lower sieve 50 each generally include a framework 102 with a pair of opposed side members 104 (only one of which is visible for each sieve 48, 50 in FIG. 2). A first cross member 108 extends between the side members 104 at one end of the side members 104 and a second cross member 110 extends between the side members 104 at an opposite end of the side members 104. In the embodiment shown, the first cross member 108 is positioned at the downstream end of the sieve 48 or 50, and the second cross member 110 is positioned at the upstream end of the sieve 48 or 50.

Figure 4:
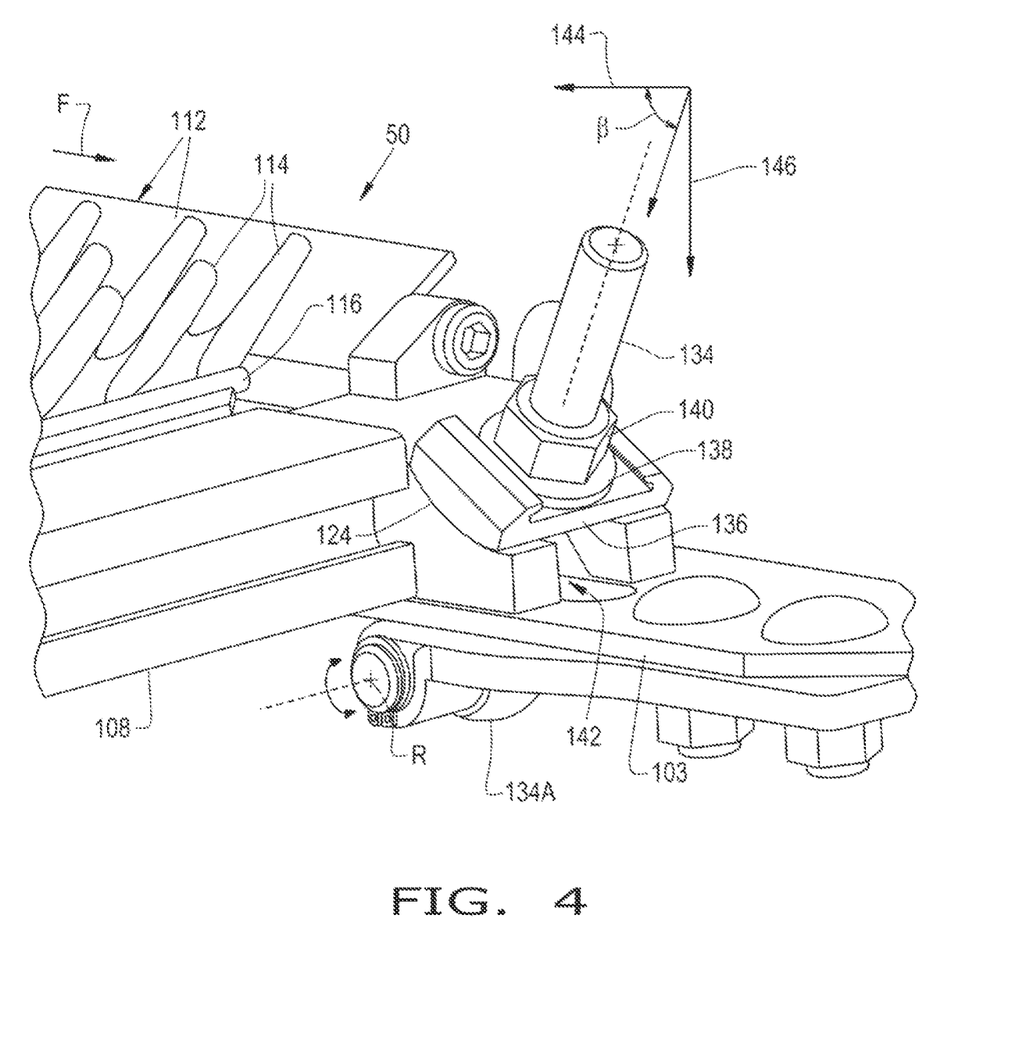
FIG. 4 is a perspective view of a portion of a sieve installed in the cleaning shoe of FIG. 3, with the sieve in a clamped position.

Referring now to FIGS. 2 and 4, the upper sieve 48 and the lower sieve 50 each include a plurality of louvres 112. Each louvre 112 includes a plurality of fingers 114 which are attached at their rear ends to a corresponding wire 116. The wires 116 are pivotally mounted at opposite ends to the side members 104. The fingers 114 overlap relative to and can be offset from the fingers 114 of adjacent louvres. The spacing between the fingers 114 of adjacent louvres can be adjusted by simultaneously rotating the wires 116 within the side members 104. FIG. 4 is a redacted view only showing a couple of the louvres 112, for simplicity sake and ease of illustration.

Figure 5:
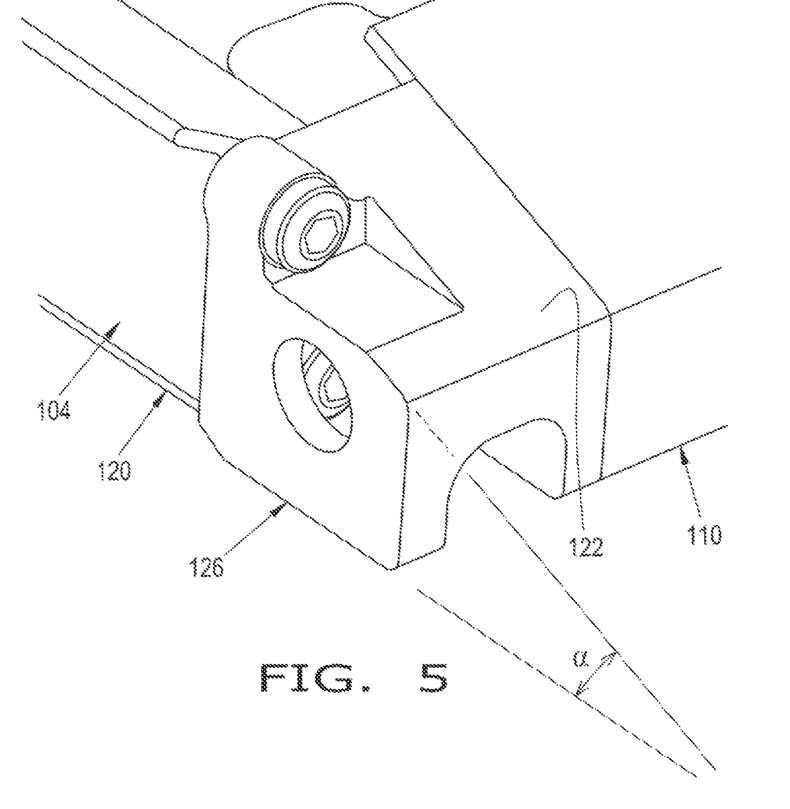
FIG. 5 illustrates an embodiment of a corner piece used at the upstream end of the sieve.
Figure 6:
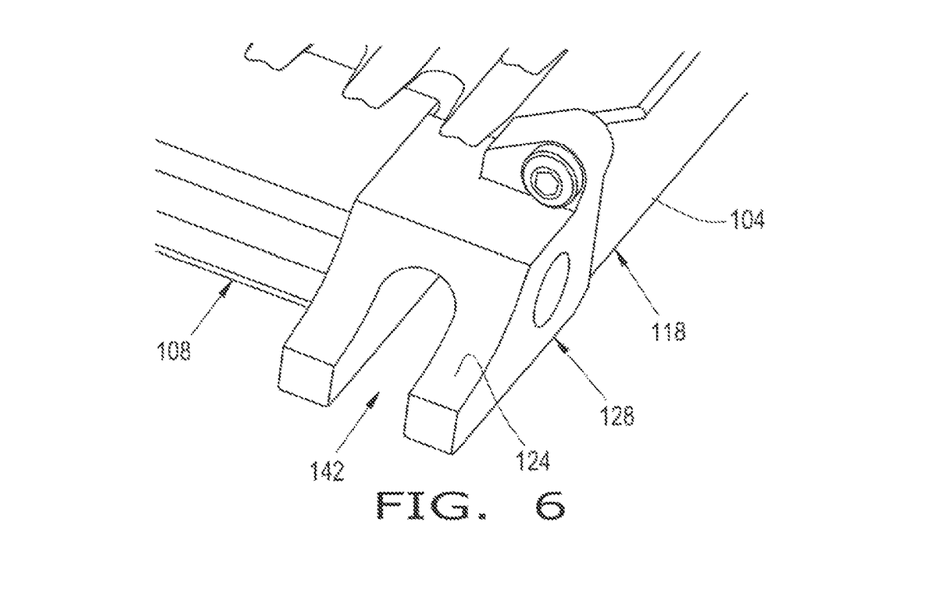
FIG. 6 illustrates an embodiment of a corner piece used at the downstream end of the sieve.

Referring now to FIGS. 4-6, the lower sieve 50 can be clamped within the cleaning shoe 101. For purposes of discussion, only the lower sieve 50 is discussed in detail herein. However, it is to be understood that the upper sieve 48 can be similarly mounted within the cleaning shoe 101.

The lower sieve 50 has a downstream end 118 and an upstream end 120 relative to a direction of air flow F through the lower sieve 50 during operation. The upstream end 120 defines at least one first angled surface 122 which is positioned at an acute angle α relative to the side rails 103 of the cleaning shoe 101. The angle α can be any desired angle allowing a wedged fit of the sieves 48, 50 with the cleaning shoe 101. For some applications, the first angled surface 122 can be parallel to the side rail 103, such that the angle α has a value at or near zero (0) relative to the side rails 103.

In the illustrated embodiment, the at least one first angled surface 122 is configured as a pair of first angled surfaces 122 which are respectively positioned at the upstream ends 120 of the two side members 104. More particularly, a pair of first corner pieces 126 respectively define the pair of first angled surfaces 122. Similarly, a pair of second angled surfaces 124 can be respectively positioned at the downstream ends 118 of the two side members 104. In the illustrated embodiment, a pair of second corner pieces 128 respectively define the pair of second angled surfaces 124. Each of the second angled surfaces 124 has an arcuate surface with a radius of curvature R. The specific value of the radius of curvature R can vary, as will be described below.

In the embodiment shown, the first and second angled surfaces 122, 124 are defined at the ends of the side members 104. However, it is possible that the angled surfaces could be formed at a different part of the downstream end 118 or upstream end 120 of the side members 104. For example, the upstream second cross member 110 can be configured as an extrusion with a wedge shape that extends across the entire width of the lower sieve 50.

The cleaning shoe 101 includes at least one first engagement surface 130 (FIG. 3) for engaging the at least one first angled surface 122 at the upstream end of the sieve 50. In the illustrated embodiment, the at least one first engagement surface 130 is in the form of an angled surface defined by a bracket 132 extending across the width of the cleaning shoe 101 between the side rails 103. The angular orientation of the angled surface defined by the bracket 132 can be slightly less than the first angled surface 122, so as to exert a slight clamping force on the first angled surface 122.

The cleaning shoe 101 also includes a pair of bolts 134 which are pivotally attached relative to a respective one of the side rails 103 and engageable with a respective second angled surface 124. In the illustrated embodiment, each of the bolts 134 is configured as an eye bolt with an axis of rotation R that is positioned below the corresponding side rail 103 of cleaning shoe 101. The eye 134A of the eye bolt 134 can be pivotally attached to the cleaning shoe 101 or side rail 103 by suitable structure, such as a bolt or pin (not numbered). Each of the bolts (134) has a longitudinal axis that is positioned at an acute angle (β) relative to the side rails (103) of the cleaning shoe (101) and biases the at least one first angled surface (122) into engagement with the at least one first engagement surface (130) when the bolts (134) are tightened against the respective second angled surface (124).

A pair of spherical washers 136, lock washers 138 and nuts 140 are respectively associated with each bolt 134. The pair of spherical washers 136 are associated with each respective bolt 134 and engageable with an arcuate surface of a respective second angled surface 124. To that end, the spherical washers 136 define second engagement surfaces which directly contact the second angled surfaces 124. The pair of second angled surfaces 124 each include a slot 142 (FIG. 6) allowing a respective one of the bolts 134 to be pivoted into place within the slot 142. Each of the spherical washers 136 has a radius of curvature which mates with a radius of curvature of the arcuate surface of a respective second angled surface 124. The radius of curvature of the spherical washer 13 can be configured to have an origin or starting point which lies along the axis of the bolt 134. The particular value of the radius of curvature of the spherical washers 136 can vary, depending on the application.

The lock washers 138 can be a separate conventional split lock washer, or alternatively can be a toothed lock washer, or integrally incorporated with the nut 140 as a serrated fastener. The lock washers 138 function to hold the bolt 134 firmly in place at a selected angle β relative to the side rails 103.

Referring to FIG. 4, the clamping action of the bolt 134 at the angle β results in two force vectors 144, 146 applied to the second angled surface 124. Angle β may be in the range of 10 degrees to 80 degrees, 30 degrees to 60 degrees, or 40 degrees to 50 degrees, for example. The force vector 144 biases the lower sieve 50 in a direction toward the first engagement surface 130 at the upstream end of the lower sieve 50. The force vector 146 biases the lower sieve 50 in a downward direction toward the side rails 103 of the cleaning shoe 101. The angled clamping force applied by the bolts 134 results in secure and reliable clamping of the lower sieve 50 within the cleaning shoe 101.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A sieve assembly for use in an agricultural harvester, the sieve assembly comprising:
 a cleaning shoe including a pair of opposed side rails; and
 a sieve which is removably installed within the cleaning shoe at a selected location against the side rails, wherein the sieve has a downstream end and an upstream end, the upstream end defining at least one first non-zero angled surface, the downstream end defining at least one second angled surface,
 wherein the cleaning shoe includes at least one first engagement surface for engaging the at least one first angled surface at the upstream end of the sieve, and the cleaning shoe including a pair of bolts, each of the bolts being pivotally attached relative to a respective one of the side rails and engageable with a respective second angled surface, each of the bolts having a longitudinal axis that is positioned at an acute angle (β) relative to the side rails of the cleaning shoe and biasing the at least one first angled surface into engagement with the at least one first engagement surface when the bolts are tightened against the respective second angled surface.

2. The sieve assembly of claim 1, wherein the at least one second angled surface each comprises an arcuate surface and a pair of spherical washers, each of the spherical washers being associated with a respective one of the bolts and engageable with a respective arcuate surface.

3. The sieve assembly of claim 2, wherein each of the spherical washers has a radius of curvature which mates with a radius of curvature of the arcuate surface.

4. The sieve assembly of claim 1, the sieve including opposed side members, the at least one first angled surface comprising a pair of first angled surfaces respectively positioned at the upstream ends of the two side members, and the at least one second angled surface comprising a pair of second angled surfaces respectively positioned at the downstream ends of the two side members.

5. The sieve assembly of claim 4, wherein the pair of second angled surfaces each include a slot allowing a respective one of the bolts to be pivoted into place within the slot.

6. The sieve assembly of claim 4, further including a pair of first corner pieces respectively defining the first angled surfaces, and a pair of second corner pieces respectively defining the second angled surfaces.

7. The sieve assembly of claim 1, wherein each of the bolts comprises an eye bolt, and further including a spherical washer, lock washer and nut associated with each bolt.

8. The sieve assembly of claim 1, wherein each of the bolts has an axis of rotation (R) which is positioned below a respective side rail of the cleaning shoe.

9. The sieve assembly of claim 1, wherein the at least one first engagement surface comprises an angled surface defined by a bracket extending across the cleaning shoe between the side rails.

10. The sieve assembly of claim 1, wherein the downstream end and the upstream end are defined relative to a direction of air flow (F) through the sieve during operation.

11. The sieve assembly of claim 1, wherein the acute angle (β) lies within a range of 30 degrees to 60 degrees.

12. The sieve assembly of claim 1, wherein the at least one first angled surface is positioned at an acute angle (α) relative to the side rails of the cleaning shoe.

13. An agricultural harvester comprising the sieve assembly of claim 1.

14. A method of installing a sieve within a cleaning system in an agricultural harvester, said method comprising installing the sieve assembly recited in claim 1.

* * * * *